United States Patent
Simmonds et al.

(10) Patent No.: US 10,113,793 B2
(45) Date of Patent: Oct. 30, 2018

(54) CRYOCOOLER-BASED GAS SCRUBBER

(71) Applicant: QUANTUM DESIGN INTERNATIONAL, INC., San Diego, CA (US)

(72) Inventors: Michael Bancroft Simmonds, Bozeman, MT (US); Jost Diederichs, San Diego, CA (US)

(73) Assignee: QUANTUM DESIGN INTERNATIONAL, INC., San Diego, CA (US)

(\*) Notice: Subject to any disclaimer, the term of this patent is extended or adjusted under 35 U.S.C. 154(b) by 541 days.

(21) Appl. No.: 13/937,186

(22) Filed: Jul. 8, 2013

(65) Prior Publication Data

US 2014/0090404 A1    Apr. 3, 2014

Related U.S. Application Data

(63) Continuation-in-part of application No. 13/763,617, filed on Feb. 8, 2013, now abandoned.

(60) Provisional application No. 61/596,722, filed on Feb. 8, 2012.

(51) Int. Cl.
*F25J 3/08* (2006.01)
*C01B 23/00* (2006.01)

(52) U.S. Cl.
CPC ............. *F25J 3/08* (2013.01); *C01B 23/0036* (2013.01); *C01B 2210/0031* (2013.01); *F25J 2205/20* (2013.01); *F25J 2205/84* (2013.01); *F25J 2215/30* (2013.01); *F25J 2260/20* (2013.01); *F25J 2270/908* (2013.01)

(58) Field of Classification Search
CPC .. F25J 3/08; F25J 3/085; F25J 2205/84; F25J 3/069; F25J 2215/30; F25J 2220/02; F25J 2220/04; F17C 2205/0341; F17C 2265/012; F17C 2221/017
See application file for complete search history.

(56) References Cited

U.S. PATENT DOCUMENTS

| | | | | |
|---|---|---|---|---|
| 1,881,116 A | * | 10/1932 | Bottoms | ................... F25J 3/061 62/639 |
| 2,202,010 A | * | 5/1940 | Kondolf | ................... F25B 43/04 62/125 |
| 2,337,474 A | * | 12/1943 | Kornemann | ............... F25J 3/08 210/182 |

(Continued)

FOREIGN PATENT DOCUMENTS

JP        2001248964        9/2001

OTHER PUBLICATIONS

ISR and Written Opinion for PCT/2013/070453 (6 pages). dated Apr. 3, 2014.

*Primary Examiner* — Frantz Jules
*Assistant Examiner* — Nelson Nieves
(74) *Attorney, Agent, or Firm* — Stetina Brunda Garred and Brucker; Mark B. Garred

(57) ABSTRACT

A cryocooler-based gas scrubber, or cryocooler-based gas purifier, utilizes the cooling power of a cryocooler to cool and condense cryogen gas forming coalesced impurities which are then filtered through a filter matrix, such as for example a fiberglass filter matrix. The scrubber may further comprise a counter-flow heat exchanger for warming the purified gas prior to dispensing at an outlet for storage or consumption.

17 Claims, 5 Drawing Sheets

(56) References Cited

U.S. PATENT DOCUMENTS

| | | | | |
|---|---|---|---|---|
| 2,964,915 A | * | 12/1960 | Hull | C07C 7/00 208/340 |
| 3,173,775 A | * | 3/1965 | Hampton | F02M 35/02 55/396 |
| 3,264,832 A | * | 8/1966 | Van Der Ster | B01D 46/30 62/629 |
| 3,704,601 A | * | 12/1972 | Campbell | F25B 9/02 62/51.2 |
| 3,942,010 A | * | 3/1976 | Peterson | F25B 9/02 250/338.1 |
| 4,223,540 A | * | 9/1980 | Longsworth | F17C 3/085 505/894 |
| 4,567,943 A | * | 2/1986 | Longsworth | F25B 9/02 165/147 |
| 4,655,046 A | * | 4/1987 | Eacobacci | F04B 37/08 417/901 |
| 4,781,033 A | * | 11/1988 | Steyert | F17C 3/085 165/10 |
| 4,810,888 A | * | 3/1989 | Boss | F17C 3/085 250/352 |
| 4,862,694 A | * | 9/1989 | Crunkleton | F25B 9/14 60/520 |
| 4,870,838 A | * | 10/1989 | Zeamer | F17C 3/085 285/47 |
| 5,099,650 A | * | 3/1992 | Crunkleton | F25B 9/14 60/520 |
| 5,187,939 A | * | 2/1993 | Skertic | F17C 3/085 244/3.16 |
| 5,243,826 A | * | 9/1993 | Longsworth | F17C 6/00 237/2 B |
| 5,249,425 A | * | 10/1993 | Longsworth | F17C 3/085 165/10 |
| 5,299,425 A | * | 4/1994 | Hingst | F25D 19/006 62/51.1 |
| 5,317,878 A | * | 6/1994 | Bradshaw | F25D 17/02 62/51.1 |
| 5,327,729 A | | 7/1994 | Kaisha et al. | |
| 5,404,016 A | * | 4/1995 | Boyd | F17C 3/085 250/338.1 |
| 5,552,608 A | * | 9/1996 | Gallagher | F17C 3/085 250/352 |
| 5,647,228 A | * | 7/1997 | Sager | B01L 7/00 62/49.2 |
| 5,737,941 A | * | 4/1998 | Hsiung | B01D 53/04 62/50.2 |
| 5,772,404 A | * | 6/1998 | Carella | F04B 37/02 417/313 |
| 5,836,172 A | * | 11/1998 | Gary | B01D 15/00 62/608 |
| 5,974,809 A | * | 11/1999 | Wooster | F04B 37/08 137/549 |
| 6,173,577 B1 | * | 1/2001 | Gold | H01L 23/445 257/E23.096 |
| 6,389,821 B2 | * | 5/2002 | Strobel | F17C 3/04 62/47.1 |
| 6,488,845 B1 | * | 12/2002 | Neufeld | B01D 29/21 210/232 |
| 8,316,651 B2 | * | 11/2012 | Schlenga | F25B 9/14 62/51.1 |
| 8,671,698 B2 | * | 3/2014 | Wang | F25B 9/10 62/47.1 |
| 9,211,488 B2 | * | 12/2015 | South | B01D 29/114 |
| 9,234,691 B2 | * | 1/2016 | Black | F17C 13/007 |
| 2002/0002830 A1 | * | 1/2002 | Strobel | F17C 3/04 62/51.2 |
| 2004/0035148 A1 | * | 2/2004 | Whitlock | C01B 21/20 62/617 |
| 2007/0075011 A1 | * | 4/2007 | Germain | B01D 29/35 210/459 |
| 2007/0214802 A1 | * | 9/2007 | Nemoto | F25B 9/10 62/47.1 |
| 2009/0293505 A1 | * | 12/2009 | Wang | F25B 9/14 62/51.1 |
| 2011/0271693 A1 | * | 11/2011 | Jiang | F25D 19/006 62/47.1 |
| 2012/0144789 A1 | * | 6/2012 | Schnacke | B01D 46/0024 55/482 |
| 2012/0167598 A1 | * | 7/2012 | Diederichs | F25D 19/00 62/6 |
| 2012/0180503 A1 | * | 7/2012 | Oikawa | F04B 37/08 62/55.5 |

\* cited by examiner

CRYOCOOLER-BASED GAS SCRUBBER

CROSS-REFERENCE TO RELATED APPLICATIONS

This application is a continuation in part of U.S. Ser. No. 13/763,617, filed Feb. 8, 2013, and titled "CRYOCOOLER-BASED GAS SCRUBBER";

which claims benefit of priority to U.S. Provisional Ser. No. 61/596,722, filed Feb. 8, 2012, and titled "CRYO-COOLED GAS SCRUBBER";

the contents of each of which are hereby incorporated by reference.

BACKGROUND OF THE INVENTION

Field of the Invention

This invention relates to cryogen gas purifiers for removing contaminants from a supply of cryogen gas and providing a purified source of cryogen gas to equipment such as liquefiers and the like; and more particularly the invention relates to helium gas purifiers configured to utilize the cooling power of a cryocooler to coalesce impurities within the helium gas for filtration through a filtering medium.

Description of the Related Art

Cryogen gases are in high demand for their application in refrigeration and cooling technologies, as well as other applications. For example, helium gas, among other cryogen gases, is often used in a variety of medical and scientific equipment, including magnetic resonance imaging (MRI), material analysis devices, and other equipment. To achieve liquid-phase helium for use with refrigeration technologies, gas-phase helium is generally liquefied within a gas liquefier by cooling the gas to a point of liquefaction. The liquid-phase helium is then evaporated to produce a flow of gas-phase helium for cooling material samples, super magnets, or other materials or components.

It is often desirable to supply high-purity helium gas to a liquefier such that accumulation of contaminants within the liquefier can be minimized, thus reducing lost time and resources attributed to equipment maintenance procedures. Moreover, certain liquefiers and other instruments benefit from the use of a high-purity cryogen gas. For example, to effectuate a specialized operation, such as high performance liquefaction, where efficient liquefaction is obtained using a pressure-controlled liquefaction region and purified helium gas as described in commonly owned U.S. Publication No. 2013/0014517, titled "LIQUEFIER WITH PRESSURE-CONTROLLED LIQUEFACTION CHAMBER"; the contents of which are incorporated by reference.

As is indicated above, as cryogen gas is condensed into liquid during a liquefaction process within a suitable liquefier, various impurities such as nitrogen, oxygen, and other impurities tend to collect within the system, thus giving rise to required maintenance. Typical maintenance may include warming the liquefier to ambient temperatures to clean out any impurities, wherein the warming cycle may require several hours or days to complete. Thus, in many cases the liquefier may be inoperable or unavailable for extended maintenance periods.

There is a need for purified cryogen gas, such as helium gas, being substantially free of contaminants, such that liquefiers and other equipment can be utilized with minimal interference associated with maintenance requirements. This need is further enhanced by such cryogen gas purifiers, or "scrubbers", being configured to quickly and efficiently provide a supply of purified cryogen gas. Additionally, such a purifier, or scrubber, configured for continuous operation without being limited by maintenance procedures is an added valuable improvement in the art.

SUMMARY OF THE INVENTION

A "cryocooler-based gas scrubber", otherwise termed a "cryocooler-based cryogen gas purifier", is provided in accordance with a plurality of embodiments.

The scrubber comprises a Dewar having one or more wells for nesting at least a cooling portion of a cryocooler and a filter assembly therein. The cryocooler functions to cool gas-phase cryogen entering the scrubber. As the gas-phase cryogen is cooled, impurities within tend to coalesce, providing an opportunity to filter the gas through the filter assembly for removing the coalesced impurities. The filtered cryogen gas is then passed through a conduit toward an output port for consumption or storage.

In certain embodiments, the conduit for communicating the filtered and purified gas-phase cryogen may be coiled about the cryocooler to form a gas-flow heat exchanger such that the purified gas can be slightly warmed toward ambient temperatures as it leaves the scrubber.

In an embodiment, the cryocooler and filter assembly reside in a single-well Dewar.

In another embodiment, the cryocooler and filter assembly are separated within the Dewar with each being individually disposed within distinct thermally isolated wells.

In yet another embodiment, the Dewar comprises a first well for containing at least a cooling portion of a cryocooler, a second well for containing a first filter assembly, and a third well for containing a second filter assembly. Cryogen gas is input into the first well and cooled by the cryocooler. A switch or valve controls the direction for which the cryogen gas continues, with two user-selectable options including the second well and associated filter assembly or the third well and associated filter assembly. In this regard, the scrubber can be operated using the filter assembly associated with the second well while the opposite filter assembly contained in the third well is undergoing maintenance. Alternatively, the filter assembly associated with the third well can be utilized while the filter assembly contained within the second well undergoes maintenance.

In another aspect, a method is disclosed for purifying cryogen gas, such as helium gas. The method comprises using a cryocooler to form coalesced impurities from an input flow of gas-phase cryogen, and filtering the gas through a filter assembly configured to trap and remove the coalesced impurities.

DETAILED DESCRIPTION OF THE PREFERRED EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

A cryocooler-based gas scrubber according to various embodiments of the invention is adapted to filter a source of cryogen gas to produce highly purified cryogen gas. The scrubber utilizes a cryocooler, such as a Gifford-McMahon (GM) cryocooler, pulse tube, or other cryocooler, to cool an input flow of cryogen gas within a closed system. Once cooled to temperatures below about 100 Kelvin, the impurities within the input flow of cryogen gas tend to coalesce and can be filtered through a porous matrix within a filter assembly.

Generally, the system can comprise a Dewar having a vacuum-insulated volume disposed between two or more shells thereof, at least a cooling portion of a cryocooler disposed within the Dewar, and a filter assembly comprising a filtration matrix. Cryogen gas is pumped into the Dewar such that the cryocooler is configured to cool the gas for coalescing impurities within the gas volume. The cooled gas is filtered through the filter assembly comprising the filter matrix wherein the filter matrix is adapted to trap coalesced impurities. The result is a filtered cryogen gas being pumped through the filter assembly and delivered to a storage container or directly to equipment for consumption.

In some embodiments, a counter flow heat exchange coil is formed from a conduit delivering the filtered cryogen gas to an outlet for storage or consumption. The conduit is disposed near the cooling portion of the cryocooler going from a bottom end to a top end. The filtered cryogen gas flowing through the conduit is warmed as the gas flows in a direction opposite of the input cryogen gas, warming as the temperature of the cryocooler gradually increases from the bottom end to the top end and input heat is communicated from the input cryogen gas flow.

In other embodiments, a counter flow heat exchanger is not provided. In this regard, the purified gas may remain cooled to temperatures below ambient temperature.

It should be recognized that although the description illustrates helium as the cryogen gas, other cryogen gases can be filtered using a similar system and are therefore deemed to be within the scope of the invention.

The impurities described herein may include nitrogen, oxygen, and other impurities that tend to be found in a supply of helium gas.

Figure 1:
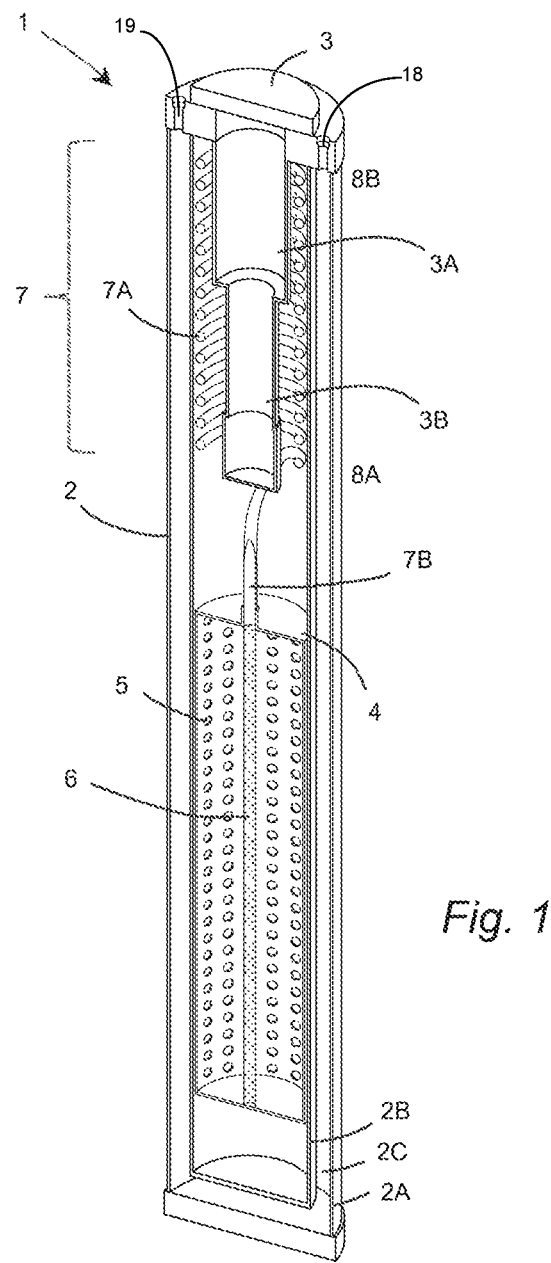
FIG. 1 illustrates a section view of a cryocooler-based gas scrubber in accordance with an embodiment.

Now turning to the drawings, FIG. 1 illustrates a cross-section of a cryocooler-based gas scrubber 1 according to certain embodiments of the invention. The scrubber comprises a Dewar 2 having one well therein and comprising a first outer shell 2A, a second inner shell 2B, and a volume 2C between the outer and inner shells being substantially evacuated of air. The scrubber further comprises a cryocooler 3 having one or more cooling stages 3A; 3B extending within the Dewar. A filter assembly 4 may comprise a perforated housing 5 and a perforated manifold tube 6 being nested within the perforated housing. A filter matrix (not shown in FIG. 1) can be disposed within the filter assembly, and may comprise a porous matrix, for example a fiberglass matrix, or other porous matrix adapted to filter impurities from the cryogen gas. In this embodiment, the perforated manifold tube is disposed at a radial center of the filter assembly 4 and extends vertically therein for directing filtered cryogen gas toward a counter-flow heat exchange 7, wherein a coiled portion 7A and conduit 7B are coupled to the perforated manifold tube 6. The coil 7A circles the cryocooler to form windings from a bottom end 8A (cold end) to a top end 8B (warm end). The cryogen gas enters and exits near the top of the Dewar at about 290K (ambient temperature).

Figure 2:
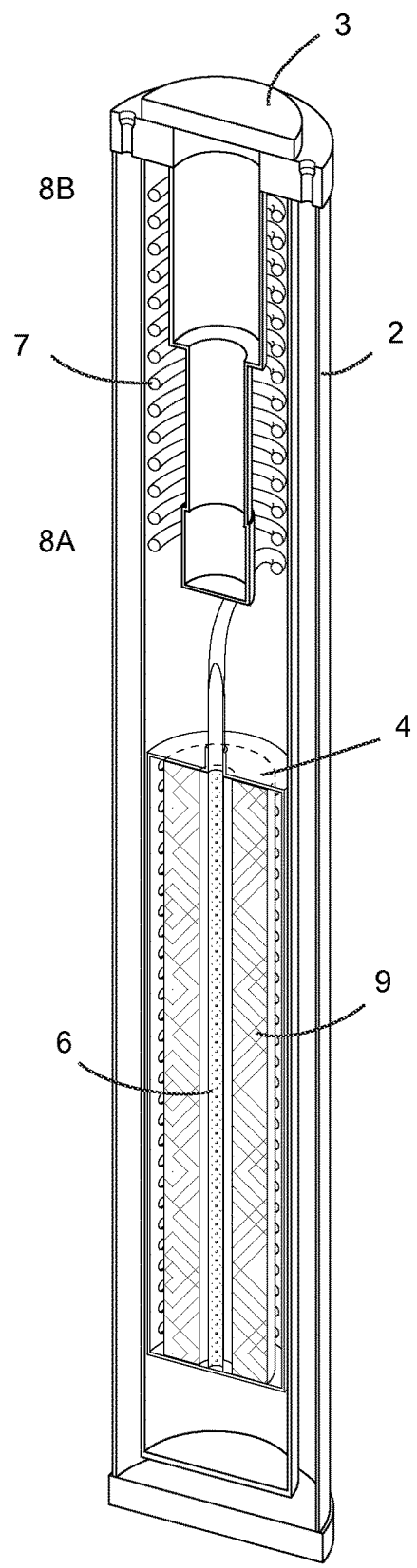
FIG. 2 illustrates a section view of the scrubber of FIG. 1 and further illustrating a filter matrix within the filter housing.

FIG. 2 further illustrates a cross section of the cryocooler-based gas scrubber of FIG. 1 as described above, and further having a filter matrix 9 housed within the filter assembly 4. The coiled conduit 7, or counter-flow heat exchanger, is adapted to coil about the cryocooler 3 from a bottom cold end 8A to a top warm end 8B.

In this embodiment, the input flow of cryogen gas, for example gas-phase helium, enters the Dewar and cools about the region of the scrubber containing the cryocooler cooling stages. The density of the cooled cryogen gas increases as the temperature decreases, and the cryogen gas flows downwardly toward the filter assembly. As mentioned above, impurities within the cryogen gas, such as nitrogen and oxygen, tend to coalesce and can be filtered through the filter assembly. The filtered cryogen gas then permeates the filter matrix leaving the impurities trapped therein, and the filtered cryogen gas enters the perforated manifold tube nested within the filter assembly. The purified cryogen gas then flows through a conduit being coiled about the cryocooler from a bottom end (cold end) to a top end (warm end). The cryogen thereby flows upwardly within the coiled conduit forming a counter-flow heat exchange whereby the cool cryogen gas absorbs heat until reaching a top end of the coiled conduit.

In various embodiments herein, the scrubber is configured such that the cryogen gas enters the scrubber at or near ambient temperature (290 K), cools to about 60 K near the cold end of the cryocooler, and because of the counter-flow heat exchange—the cryogen is returned to near ambient temperature upon reaching an exit port at the top end of the coiled conduit. These temperatures are provided for illustrative purposes, and may vary depending on factors such as the power of the cryocooler, volume of the Dewar, and other factors that will be recognized by those with skill in the art.

Figure 3:
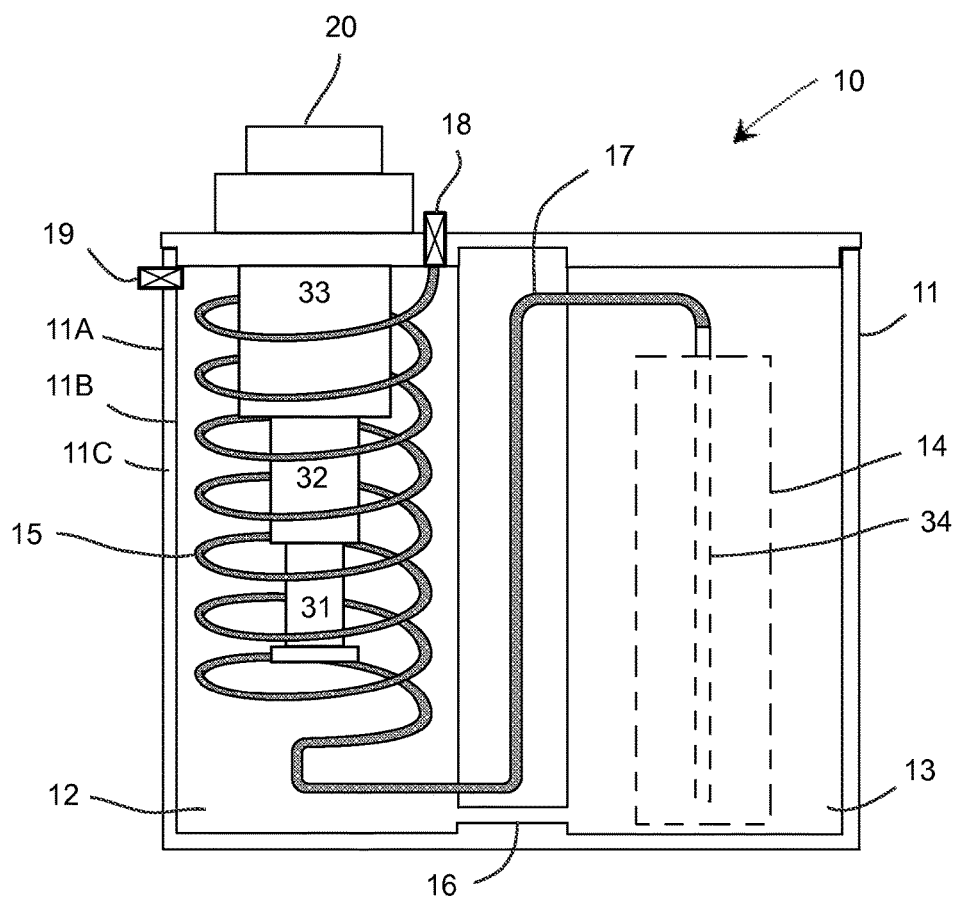
FIG. 3 illustrates a cryocooler-based gas scrubber in accordance with another embodiment.

FIG. 3 illustrates another embodiment of a side-by-side unit, or two-well unit, wherein a cryocooler-based gas scrubber 10 comprises a Dewar 11 having a first well 12 adapted for cooling an input flow of cryogen gas and warming an output highly-purified cryogen gas via a counter-flow heat exchanger 15, and a second well 13 configured to filter impurities from within the cryogen gas. The Dewar comprises a first shell 11A and a second shell 1B nested within the first shell 11A and having a volume therebetween 11C being substantially evacuated of air to form an insulated container. At least a portion of a cryocooler 20 extends within the first well 12, the cryocooler comprising one or more cooling stages 31; 32; 33, respectively. A coiled-conduit 15 is coiled about the cryocooler from a bottom end near a third cooling stage 31, to a top end near a first cooling stage 33. The coiled conduit 15 is further coupled to a manifold 34 disposed in the adjacent second well 13. The manifold 34 is contained within a filter assembly housing 14. The first and second wells 12; 13, respectively, comprise a connection 16 extending therebetween near a bottom portion of the Dewar, the connection being adapted to communicate a flow of cooled cryogen gas from the first well 12 to the second well 13, and may comprise for example a tube, passage, hose, or other connection. Once inside the second well 13, the cryogen gas permeates through the filter assembly housing 14, and filter matrix therein (not shown), thereby filtering an amount of impurities before permeating the manifold tube 34 within the filter assembly. Once filtered, the cryogen gas flows from the second well to the first well via conduit 17, and upwardly through the coiled conduit 15 progressing from the bottom end of the cryocooler to the top end; i.e. the counter-flow heat exchanger. The scrubber may comprise one or more input ports 19 and output ports 18. Each of the input and output ports may comprise a valve or pump for controlling the flow of cryogen gas into and out of the unit.

Figure 4:
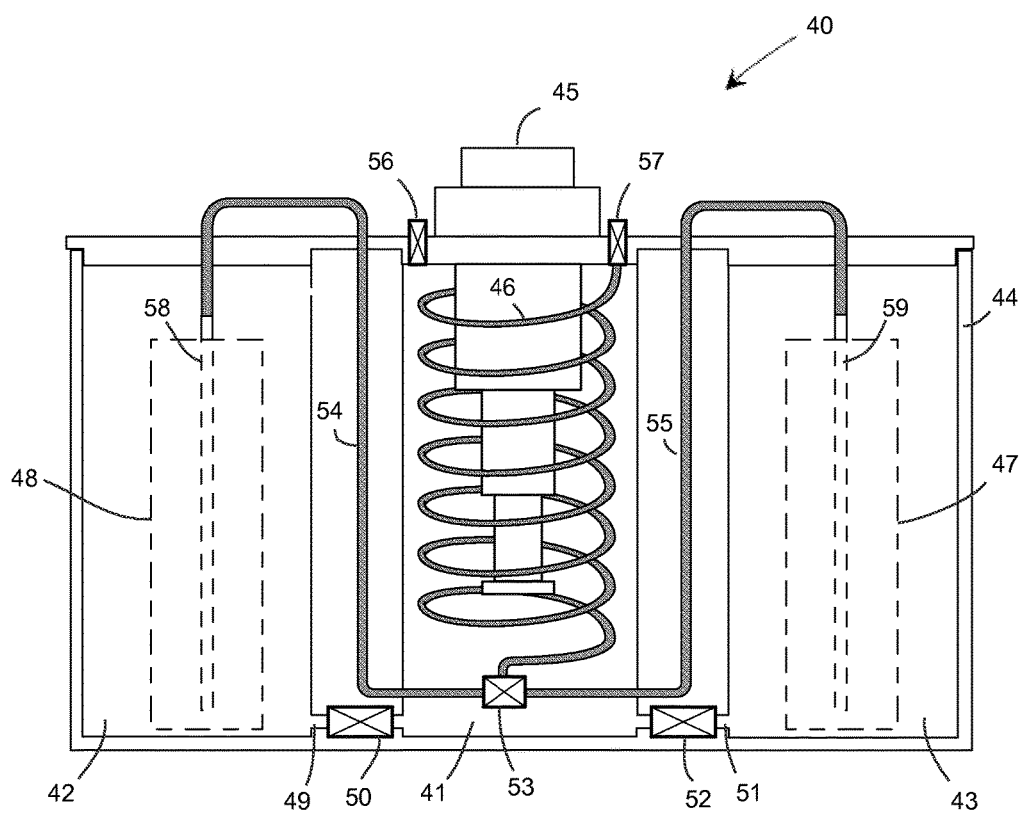
FIG. 4 illustrates a cryocooler-based gas scrubber in accordance with yet another embodiment.

FIG. 4 illustrates another embodiment, wherein the scrubber 40 comprises a Dewar 44 having a first well 41, a second well 42, and a third well 43. The scrubber comprises a cryocooler 45 at least partially extending within the first well, and a coiled conduit 46 wrapping about one or more stages of the cryocooler to provide a counter-flow heat exchange. The second well 42 comprises a first filter assembly 48 comprising a first filter housing, a first filter matrix within the first filter housing, and a first manifold tube nested within the first filter housing (See FIG. 5 for detail). The first manifold tube 58 is coupled with the coiled conduit 46 through a first coupler tube 54 and a coil valve 53. The third well 43 comprises a second filter assembly 47, similar to the first filter assembly 48, the second filter assembly comprising a second filter housing, a second filter matrix, and a second manifold tube 59 disposed nested within the second filter assembly. The second manifold tube 59 is coupled with the coiled conduit 46 through a second coupler tube 55 and the coil valve 53. A first port valve 50 is disposed between a first port 49 extending between the first well 41 and the second well 42; the first port valve 50 is adapted to communicate a flow of cooled cryogen from the first well 41 to the second well 42. Likewise, a second port valve 52 is disposed between a second port 51 extending between the first well 41 and the third well 43; the second port valve 52 is adapted to communicate a flow of cooled cryogen from the first well 41 to the third well 43.

In this regard, the first filter assembly 48 can be utilized until impurities begin to clog the filter matrix, at which point one or more valves 50; 52; 53 can be configured such that the second filter assembly 47 is used in place of the first filter assembly. During operation using the second filter assembly 47, the first filter assembly 48 can undergo a maintenance procedure to extract the impurities from the filter matrix therein. Then, as the second filter assembly 47 becomes saturated with impurities, the system can revert to usage of the first filter assembly 48 by configuring the respective valves 50; 52; 53. The valves can be configured manually, or by computer control. Because the design and function of both manual and computer-controlled valves are well understood by those having skill in the art, they will not be further addressed here. In this regard, the embodiment of FIG. 4 provides a continuous multi-well cryogen gas scrubber capable of operation without downtime.

Figure 5:
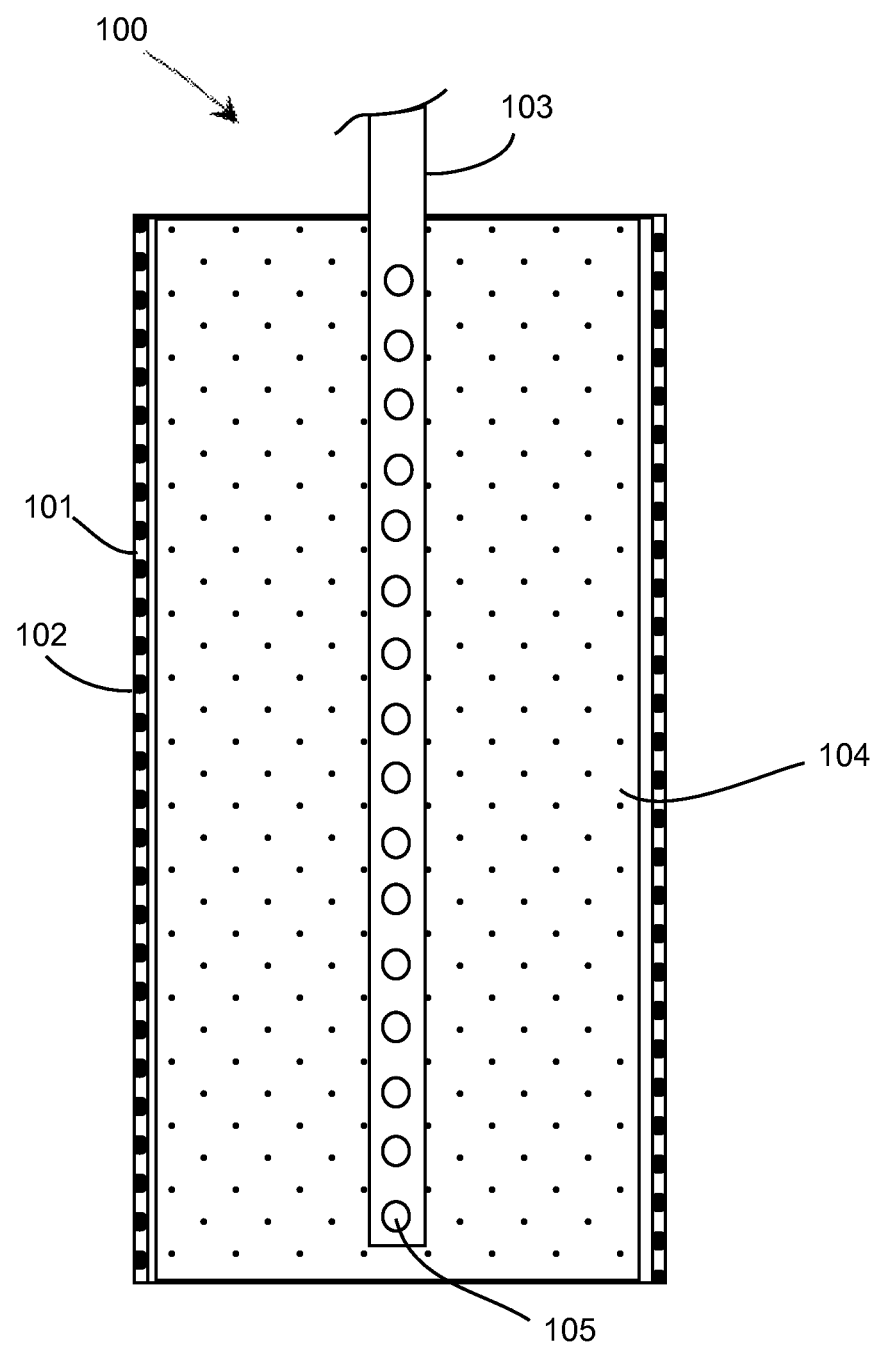
FIG. 5 illustrates a filter assembly in accordance with various embodiments.

FIG. 5 illustrates an example of a typical filter assembly for use in the various embodiments herein. The filter assembly 100 comprises a perforated filter housing 101 having a number of apertures 102 disposed about a surface thereof. The filter housing 101 is generally cylindrical; however any other geometry may be implemented in a similar fashion. Within the filter housing 101 is a manifold tube 103 contained within the housing. The manifold tube may comprise one or more manifold apertures 105 extending along the manifold tube for receiving filtered cryogen gas. A volume of the filter assembly disposed between the manifold tube 103 and the housing 101 may be filled with a filter matrix 104, such as a fiberglass filter matrix. In this regard, the filter assembly 100 is configured to filter cryogen gas flowing through the filter housing 101, through the filter matrix 104, and through the manifold tube 103, respectively, such that impurities are filtered through the matrix 104 and purified cryogen gas is received through the manifold tube 103 toward an output where the gas can be collected for storage or used directly with equipment.

Although various embodiments herein illustrate a cryocooler-based gas scrubber having a coiled conduit nested around one or more cooling stages of a cryocooler it should be recognized by those having skill in the art that a purifier may be practiced without the coiled conduit. In this regard, the highly purified cryogen gas may be communicated from a filter assembly directly to an output port of the scrubber. A result of this configuration may include a significantly cool purified gas, which may or may not be desirable based on the intended use of the purified cryogen gas.

The cryocooler-based gas scrubber can be coupled directly to a liquefier, or may be a stand-alone unit coupled to a bottling system for storing purified cryogen gas.

Thus, in an embodiment, a cryocooler-based gas scrubber comprises: a Dewar having a first shell nested within a second shell and a volume therebetween being substantially evacuated of air to form an insulated container, the Dewar comprising at least one well extending from a bottom end to a top end defining an interior volume of the Dewar; a cryocooler having a cooling portion extending within the interior volume of the Dewar at the top end thereof; and a filter assembly disposed within the interior volume of the Dewar; the gas scrubber being configured to cool an input flow of cryogen gas sufficiently to cause coalescing of impurities within the gas flow, and to filter the coalesced impurities at the filter assembly for delivering purified cryogen gas.

In another embodiment, the filter assembly comprises: a perforated filter housing having a plurality of apertures disposed about a surface thereof; a perforated manifold tube extending along a length of the filter assembly; and a filter matrix disposed therebetween; wherein the filter assembly is adapted to trap the coalesced impurities within the filter matrix.

In another embodiment, the filter matrix comprises a fiberglass material.

In another embodiment, the cryocooler is one of a GM-type refrigerator or a pulse tube refrigerator.

In another embodiment, the scrubber comprises two or more cryocoolers.

In another embodiment, the perforated manifold tube of the filter assembly is coupled to a counter-flow heat exchanger for warming the gas to near ambient temperature prior to delivering to an outlet for consumption of purified gas.

In another embodiment, the counter-flow heat exchanger comprises a length of conduit wrapped around the cryocooler from the bottom end to the top end thereof.

In another embodiment, the Dewar comprises: a first well and a second well; the first well configured in fluid-communication with the second well via a first port extending therebetween; the cryocooler being disposed within the first well; the filter assembly being disposed within the second well, and a conduit extending from the perforated manifold tube to an outlet; wherein scrubber is adapted to cool the cryogen gas in the first well, communicate the gas flow from the first well to the second well through the first port, and filter the impurities from the cryogen gas through the filter assembly disposed in the second well.

In another embodiment, the Dewar further comprising a third well; the first well further configured to be in fluid-communication with the third well via a second port extending therebetween; a second filter assembly being disposed within the third well, and a second conduit extending from a second perforated manifold tube of the second filter assembly to an outlet; the first port comprising a first valve and the second port comprising a second valve, each of the first and second valves being adapted to regulate a gas-flow therebetween; a third valve disposed between the conduits and the counter-flow heat exchanger, the third valve adapted to select one of the conduits for supplying purified cryogen gas to the counter-flow heat exchanger; wherein the scrubber is adapted to cool the cryogen gas in the first well, communicate the gas flow from the first well to one of the second well or third well through the first port or second port, respectively, and filter the impurities from the cryogen gas through the selected filter assembly of the second or third well.

In another embodiment, a cryocooler-based gas scrubber, comprises: a Dewar having one or more wells within an outer shell and an inner shell, and a volume between the outer shell and inner shell being substantially evacuated of air; a cryocooler having one or more cooling stages extending within one of the wells; a filter assembly comprising a perforated filter housing, a filter matrix, and a perforated manifold tube disposed along a radial center of the filter assembly; and a coiled conduit adapted to wrap about the one or more stages of the cryocooler from a bottom cold end to a top warm end; wherein the scrubber is adapted to cool an input flow of cryogen gas to a temperature for coalescing impurities within the cryogen gas, filter impurities from the cryogen gas to form a highly-purified cryogen gas, and warm the purified cryogen gas through counter flow heat exchange as the gas flows through the coiled conduit from the bottom cold end to the top warm end.

In another embodiment, the scrubber comprises two wells, wherein a first well houses the cryocooler and coiled conduit; and wherein a second of the two wells houses the filter assembly.

In another embodiment, the first well is connected to the second well at a connection extending therebetween.

In another embodiment, a valve disposed at the connection between the first and second wells.

In another embodiment, a third well, wherein a second filter assembly is housed in the third well.

In another embodiment, a method for purifying a cryogen gas, comprises: cooling the cryogen gas within a Dewar using a cryocooler disposed therein; with the cryogen gas cooled to a temperature at which impurities coalesce, filtering the impurities from the cryogen gas using a filter assembly comprising a filter matrix; and warming the gas through a coiled conduit adapted to coil about the cryocooler from a bottom cold end to a top warm end for providing counter-flow heat exchange.

Using the embodiments described above and in FIGS. 1-5, one having skill in the art can envision similar embodiments having three or more wells, two or more cryocoolers, three or more filter assemblies, etc. These and other variations are therefore deemed to be within the scope of the invention as set forth in the claims.

We claim:

1. A cryocooler-based gas scrubber, comprising:
a Dewar having a first shell nested within a second shell and a volume therebetween being substantially evacuated of air to form an insulated container, the Dewar comprising at least one well extending from a bottom end to a top end defining an interior volume of the Dewar;
a gas input port connected to the interior volume of the Dewar, arranged so that a gas entering said Dewar can fill said interior volume;
a cryocooler having a cooling portion extending within the interior volume of the Dewar; and
a filter assembly disposed within the interior volume of the Dewar, coaxially aligned with the cyrocooler, and downstream of the cryocooler such that the gas flows past the cryocooler before entering the filter assembly;
a counter-flow heat exchanger coupled to, and downstream of, the filter assembly for warming the gas to near ambient temperature prior to delivering to an outlet;
the gas scrubber being configured to:
cool an input flow of cryogen gas sufficiently to cause coalescing of impurities within the input gas flow and
filter the coalesced impurities at the filter assembly for delivering purified cryogen gas.

2. The cryocooler-based gas scrubber of claim 1, wherein said filter assembly comprises: a perforated filter housing having a plurality of apertures disposed about a surface thereof; a perforated manifold tube extending along a length of the filter assembly and formed as an integral extension of the counter-flow heat exchanger; and a filter matrix disposed between the perforated filter housing and the perforated manifold tube; wherein the filter assembly is adapted to trap the coalesced impurities within the filter matrix.

3. The cryocooler-based gas scrubber of claim 2, wherein the filter matrix comprises a fiberglass material.

4. The cryocooler-based gas scrubber of claim 1, wherein the cryocooler is one of a GM-type refrigerator or a pulse tube refrigerator.

5. The cryocooler-based gas scrubber of claim 1, comprising two or more cryocoolers.

6. The cryocooler-based gas scrubber of claim 1, wherein the counter-flow heat exchanger comprises a length of conduit wrapped around the cryocooler from a bottom end to a top end thereof, such that gas flowing along the cryocooler is cooled from both the cryocooler and the counter-flow heat exchanger.

7. The cryocooler-based gas scrubber of claim 1, wherein the Dewar comprises: a first well and a second well; the first well configured in fluid-communication with the second well via a first port extending therebetween; the cryocooler being disposed within the first well; the filter assembly being disposed within the second well, and a conduit extending from the perforated manifold tube to an outlet; wherein scrubber is adapted to cool the cryogen gas in the first well, communicate the gas flow from the first well to the second well through the first port, and filter the impurities from the cryogen gas through the filter assembly disposed in the second well.

8. The cryocooler-based gas scrubber of claim 7, the Dewar further comprising a third well; the first well further configured to be in fluid-communication with the third well via a second port extending therebetween; a second filter assembly being disposed within the third well, and a second conduit extending from a second perforated manifold tube of the second filter assembly to an outlet; the first port comprising a first valve and the second port comprising a second valve, each of the first and second valves being adapted to regulate a gas-flow therebetween; a third valve disposed between the conduits and the counter-flow heat exchanger, the third valve adapted to select one of the conduits for supplying purified cryogen gas to the counter-flow heat exchanger; wherein the scrubber is adapted to cool the cryogen gas in the first well, communicate the gas flow from the first well to one of the second well or third well through the first port or second port, respectively, and filter the impurities from the cryogen gas through the selected filter assembly of the second or third well.

9. A cryocooler-based gas scrubber, comprising:
a Dewar having one or more wells within an outer shell and an inner shell, and a volume between the outer shell and inner shell being substantially evacuated of air;
a gas input port connected to the interior volume of the Dewar, arranged so that a gas entering said Dewar can fill said interior volume;
a cryocooler having one or more cooling stages extending within at least one of said wells;
a filter assembly coaxially aligned with the cryocooler, the filter assembly comprising a perforated filter housing, a filter matrix, and a perforated manifold tube nested within the filter assembly, the filter assembly being located downstream of the cryocooler, such that the gas flows past the cryocooler before entering the filter assembly; and
a coiled conduit formed as an extension of the perforated manifold tube, the coiled conduit being adapted to wrap about the one or more stages of the cryocooler from a bottom cold end to a top warm end;
wherein the scrubber is adapted to cool an input flow of cryogen gas using both the cryocooler and the coiled conduit to a temperature for coalescing impurities within the cryogen gas, filter impurities from the cryogen gas to form a highly-purified cryogen gas, and warm the purified cryogen gas through counter flow heat exchange as the gas flows through the coiled conduit from the bottom cold end to the top warm end.

10. The cryocooler-based gas scrubber of claim 9, comprising two wells, wherein a first well houses the cryocooler and coiled conduit; and wherein a second of the two wells houses the filter assembly.

11. The cryocooler-based gas scrubber of claim 10, wherein the first well is connected to the second well at a connection extending therebetween.

12. The cryocooler-based gas scrubber of claim 11, comprising a valve disposed at the connection between the first and second wells.

13. The cryocooler-based gas scrubber of claim 11, further comprising a third well, wherein a second filter assembly is housed in the third well.

14. A cryocooler-based gas scrubber, comprising:
a Dewar having one or more wells within an outer shell and an inner shell, and a volume between the outer shell and inner shell being substantially evacuated of air;
a gas input port connected to the interior volume of the Dewar, arranged so that a gas entering said Dewar can fill said interior volume;
a cryocooler having one or more cooling stages extending within at least one of said wells;
a filter assembly coaxially aligned with the cryocooler, the filter assembly comprising a perforated filter housing, a filter matrix, and a perforated manifold tube nested within the filter assembly; and
a coiled conduit fluidly connected to the filter assembly such that the coiled conduit is downstream from the filter assembly, the coiled conduit being adapted to wrap about the one or more stages of the cryocooler from a bottom cold end to a top warm end;
the cryocooler and the coiled conduit being adapted to collectively cool an input flow of cryogen gas to a temperature for coalescing impurities within the cryogen gas;
the filter assembly being adapted to filter impurities from the cryogen gas to form a purified cryogen gas.

15. The cryocooler-based gas scrubber of claim 14, wherein said filter assembly comprises: a perforated filter housing having a plurality of apertures disposed about a surface thereof; a perforated manifold tube extending along a length of the filter assembly; and a filter matrix disposed therebetween; wherein the filter assembly is adapted to trap the coalesced impurities within the filter matrix.

16. The cryocooler-based gas scrubber of claim 15, wherein the filter matrix comprises a fiberglass material.

17. The cryocooler-based gas scrubber of claim 1, wherein the filter assembly is complementary in shape to that of the first shell of the Dewar.

* * * * *